United States Patent [19]

Klebe et al.

[11] 4,178,351

[45] Dec. 11, 1979

[54] PROCESS FOR THE STABILIZATION OF SODIUM PERCARBONATE

[75] Inventors: Hans Klebe; Gerd Knippschild, both of Rheinfelden, Fed. Rep. of Germany

[73] Assignee: Deutsche Gold- und Silber-Scheideanstalt Vormals Roessler, Frankfurt, Fed. Rep. of Germany

[21] Appl. No.: 951,461

[22] Filed: Oct. 16, 1978

[30] Foreign Application Priority Data

Oct. 31, 1977 [DE] Fed. Rep. of Germany ....... 2748783

[51] Int. Cl.² .............................................. C01B 15/10
[52] U.S. Cl. ................................ 423/275; 423/415 P; 252/186
[58] Field of Search .................... 423/274, 275, 415 P; 427/215; 252/186

[56] References Cited

U.S. PATENT DOCUMENTS

| 3,640,885 | 2/1972 | Rhees | 252/186 |
| 3,773,678 | 11/1973 | Munday | 423/582 |

FOREIGN PATENT DOCUMENTS

| 2448453 | 4/1975 | Fed. Rep. of Germany | 423/415 P |
| 999775 | 2/1952 | France | 423/275 |
| 174891 | 1/1922 | United Kingdom | 423/275 |

Primary Examiner—G. O. Peters
Attorney, Agent, or Firm—Cushman, Darby & Cushman

[57] ABSTRACT

Sodium percarbonate is stabilized with highly dispersed silica. The sodium percarbonate containing 1 to 10 weight % of water is mixed with the silica and subsequently dried. The highly dispersed silica has an average particle size of 2-100 microns, preferably 7-20 microns. The product is sodium percarbonate particles encased by a sodium silicate jacket.

9 Claims, No Drawings

PROCESS FOR THE STABILIZATION OF SODIUM PERCARBONATE

BACKGROUND OF THE INVENTION

Sodium percarbonate because of its hygroscopicity to moisture is known to be very unstable compared to sodium perborate tetrahydrate.

Even very small amounts of moisture, as occur for example in washing or cleaning agent mixtures lead to a rapid reduction of the active oxygen content as well as to a clumping of the washing or cleansing agent itself.

Therefore, it has already been tried to counteract this disadvantage in the use of sodium percarbonate, namely by addition of known stabilizers for hydrogen peroxide, e.g. alkaline earth silicates (Meier-Evert, German Pat. No. 870,092.

Even if silica containing compounds, namely silica itself, are added subsequently in preference to other materials for stabilization (as coatings of paraffin or polyethylene glycol or to the use of several stabilizers simultaneously (German OS No. 2511143) the stability of the percarbonate attained therewith in moist atmosphere was still very insufficient.

The reason is first because of industrially incompletely carrying out the contacting of the percarbonate and the stabilizing silica containing compound.

Thus if there were added for example silica aerosols (which themselves are very difficult to disperse) during the production of the percarbonate to the reaction mixture or to the dry percarbonate powder, or in certain cases even to the already prepared percarbonate solution (German Pat. No. 870,092 and German OS No. 2448453) the two materials present subsequently separate from each other and a stabilizing effect can scarcely occur.

Or the encasing of the percarbonate particles can take place. However, the necessary industrial procedure is extremely troublesome and besides does not always lead to a sufficient encasing.

Thus according to the process of German OS No. 2448453 sodium percarbonate was sprayed with an aqueous sol which contains 3–8% silica and has a pH of 3 to about 10.

However, this encasing material was produced by deionization of water soluble silicates such as alkali silicates with the help of cation exchangers. The aqueous sols thus produced, however, are not stable over long periods of time, but must be further used in a suitable time. In other words, the stabilization of the percarbonate continuously requires an operationally ready ion exchange equipment, since the thus produced sols are not stable.

In spite of this expense after only 6 days in the washing agent storage test in moist atmosphere in the most favorable case there was already destroyed 10% of the active oxygen.

Since coatings of alkali silicate are hygroscopic because of their reaction with the carbon dioxide content of the air, there were used in German OS 2511143 aqueous mixtures of alkali or alkaline earth silicates and similarly silicofluorides for coating the percarbonate particles. These particles are present in the dry condition and are sprayed with the above mentioned mixture.

A spraying of silica containing sols, however, is not always simple to carry out because of the danger of crystallization and requires a specific standard industrial expense. Therefore, both of the last mentioned processes of the German OS Nos. 2448453 and 2511143 are quite expensive industrially.

The object of the invention is to provide sodium percarbonate in a simple manner with a silica containing coating and to obtain a product stable against moisture.

SUMMARY OF THE INVENTION

It has now been found that sodium percarbonate can be stabilized for storage in a wet atmosphere if sodium percarbonate having a content of 1–10 weight % of water, based on the percarbonate, is intensively mixed with highly dispersed silica and subsequently is dried in conventional manner.

By this procedure, there is formed on the surface of the sodium percarbonate sodium silicate. This is not the case when mixing with dry sodium percarbonate since according to the invention during the subsequent drying the water carried along from the sodium percarbonate evaporates and a sodium silicate jacket or encasing layer forms on the surface which protects the sodium percarbonate, especially in a moist atmosphere.

As sodium percarbonate containing 1–10 weight % of water there is preferably added the product resulting after the crystallization.

Naturally, however, it is also possible to mix in the corresponding amount of water into the customary dry percarbonate.

As highly dispersed silica is meant a silica which has an average primary particle size of 2 to 100 microns.

Preferably there are used silicas having a primary particle size of 7–20 microns.

There can also be used particles with larger diameter, however, with these the encasement of the sodium percarbonate particles becomes more inhomogeneous.

This silica is added dry to the percarbonate.

The production of this type of silica is known, e.g. according to the process of Wagner German Pat. No. 974,793 and related, Wagner U.S. Pat. No. 2,990,249. The entire disclosure of the Wagner U.S. patent is hereby incorporated by reference. Such a silica is known as a pyrogenic silica.

The temperature of mixing is not critical, normally there is used the temperature of the moist percarbonate leaving the crystallizer. In any case, there must be avoided temperatures which can lead to the decomposition of active oxygen.

The mixing takes place in simple mixing apparatuses, such as granulating drums, endless screws, mixers, and can be either continuous or non-continuous.

The mixing of the two components is continued so long as the silica particles are taken up on the surface of the wet sodium percarbonate particle. This is ascertainable by a preliminary test.

In connection with the mixing the product obtained is dried in the usual manner and there is formed the sodium silicate jacket.

The amount of highly dispersed silica is so regulated that the product obtained contains 0.05 to 5 weight % $SiO_2$.

Unless otherwise indicated all parts and percentages are by weight.

The product can comprise, consist essentially of or consist of the materials set forth and the process can comprise, consist essentially of or consist of the steps set forth with such materials.

The process will be explained further in connection with the following example.

DESCRIPTION OF THE PREFERRED EMBODIMENT

In the example the abbreviations have the following meanings:

NaPc = sodium percarbonate
Oa = active oxygen
rel. L.F. = relative humidity

EXAMPLE

There were present 1,000 grams of sodium percarbonate in a rotating drum (diameter=250 mm, height=250 mm) which contained at equal intervals 4 ribs 15 mm wide at an inclination of 15° and the drum had a rotational speed of 30 revolutions per minute (rpm). In a single process step 40 grams of water (corresponding to 4%) were sprayed on the sodium percarbonate. Immediately thereafter 24.5 grams of highly dispersed (pyrogenic) silica (average primary particle size=12 microns) were mixed in.

Finally the $SiO_2$ encased NaPc was dried at 55°–60° C. for about 30 minutes in a drying cabinet.

There was obtained a product with the following analytical results.

Active oxygen—13.26%
$SiO_2$—0.99%
$CO_2$—26.53%
$Fe_2O_3$—0.003%
Bulk density—1.030 kg/l

Sieve analysis

On 0.8 mm—4%
On 0.5 mm—37%
On 0.4 mm—13%
On 0.2 mm—35%
On 0.1 mm—10%
Residue—1%

| Oa decomposition at + 30° C. and 92.9% vel. L.F.: | | NaPc Starting Material Unstabilized | $SiO_2$ Stabilized NaPc |
|---|---|---|---|
| after 4 days | % | 21.2 | 1.6 |
| after 7 days | % | 45.0 | 6.8 |
| after 10 days | % | 59.0 | 8.4 |

To carry out the climate test at +30° C. and 92.9% relative humidity there were prepared three desiccators (diameter 150 mm, height 150 mm) in which the materials to be tested were stored 4, 7 and 10 days.

There were filled into the desiccators 760 ml of saturated $NH_4H_2PO_4$ solution with a solid bottom phase.

Each desiccator was charged with 10 open weighing glasses (diameter 35 mm, height 30 mm) in each of which there was placed 2 grams (±0.01 gram) of material per weighing glass.

5 weighing glasses contained the unstabilized starting material and the remaining 5 the $SiO_2$ stabilized sodium percarbonate.

After the finish of the time of the test in each case, one of the desiccators was taken out of the drying cabinet, the weighing glass back weighed and the total sample used as originally weight-in quantity for the determination of the residual oxygen.

What is claimed is:

1. A process for stabilizing sodium percarbonate particles comprising mixing sodium percarbonate containing 1 to 10 weight % of water based on the percarbonate with dry highly dispersed silica and then drying to form sodium percarbonate particles having a surrounding jacket of sodium silicate.

2. The process according to claim 1 wherein the silica is pyrogenic silica.

3. The process of claim 1 wherein the highly dispersed silica has an average primary particle size of 2 to 100 microns.

4. The process of claim 3 wherein the silica has an average primary particle size of 7 to 20 microns.

5. The process of claim 4 wherein there is employed sufficient silica that the product obtained has 0.05 to 5 weight % silica.

6. The process of claim 5 wherein the product obtained has about 1 weight % silica.

7. The process of claim 1 wherein there is employed sufficient silica that the product obtained has 0.05 to 5 weight % silica.

8. The product prepared by the process of claim 1.

9. The product of claim 8 wherein sufficient silica is employed that the product has 0.05 to 5 weight % silica.

* * * * *